United States Patent [19]

Weerstra

[11] 4,169,359
[45] Oct. 2, 1979

[54] APPARATUS FOR THE PRODUCTION OF SOFT-ICE

[75] Inventor: Rienk Weerstra, Leeuwarden, Netherlands

[73] Assignee: Sweden Freezer Manufacturing Co., Seattle, Wash.

[21] Appl. No.: 808,124

[22] Filed: Jun. 20, 1977

[30] Foreign Application Priority Data

Jul. 8, 1976 [NL] Netherlands ............... 7607558

[51] Int. Cl.² .................. A23G 9/04; F25D 17/00
[52] U.S. Cl. .................. 62/178; 62/343; 222/227; 366/146; 366/149
[58] Field of Search ................ 62/342, 343, 178; 366/144, 154, 155, 156, 169, 146; 222/227, 236

[56] References Cited

U.S. PATENT DOCUMENTS

| 3,013,701 | 12/1961 | Joschko | 222/227 |
| 3,251,512 | 5/1966 | Irving | 222/227 X |
| 3,307,748 | 3/1967 | Dunn, Jr. | 222/227 |
| 3,318,579 | 5/1967 | Foucault | 366/169 |
| 3,592,444 | 7/1971 | Arvanitakis | 366/156 X |
| 3,818,716 | 6/1974 | Carpigiani | 62/343 X |
| 3,858,498 | 1/1975 | Swenson | 62/342 X |

Primary Examiner—Irwin C. Cohen
Attorney, Agent, or Firm—Seed, Berry, Vernon & Baynham

[57] ABSTRACT

Dry powder mix is mixed with water in accurate amounts on demand, the water and powder pass through an axial passage of a mixing rotor and must pass radially outward in a mixing bowl through a narrow gap to a tangential discharge opening. Demand is determined by startup and continuous operation level sensors arranged to maintain accurate and limited levels of mixed product in the freezing cylinder.

13 Claims, 5 Drawing Figures

APPARATUS FOR THE PRODUCTION OF SOFT-ICE

The invention relates to an apparatus for the production of soft ice, provided with a reservoir for powdery ice composition or dry powder mix, a dosage device with a screw conveyor for the powder, a supply pipe for water, a mixer, at least one level-sensor and a freezing cylinder containing a stirrer therein.

Such an apparatus is known from the Dutch patent application No. 73 09374 in which the dosage device consists of only a screw conveyor which extends with one end in the powder mix reservoir and at the other end directly pours the powder into the mixer. The direct pouring of the powder mix into the mixer is a disadvantage because the powder mix is in this way insufficiently accurately dosed. One reason for this is that powder is sticky and the second reason is the threads of the screw conveyor do not become uniformly filled with powder. A second reason is that as the filling level of the powder mix reservoir varies the density of the powder near the bottom of the reservoir will vary depending on the level in the reservoir. A high dosage accuracy is required because the final product (soft-ice) must have an almost uniform composition. Government commodity statutory regulations require that the dry powder material content not be too low and moreover the taste would be too watery. On the other hand the mix content cannot be too high because then the ice would be too sweet and too rich.

Moreover, according to above mentioned Dutch patent application the mixer is aligned with the freezing cylinder in a common housing with only a partial baffle between the mixer and the freezing cylinder. This is a disadvantage for dissolving powder mix in the water in the mixer, as this kind of powder, when dissolved in water, forms slimy lumps. Furthermore, the mixture of powder and water which is already present in the mixer is cold because it is in the vicinity of the freezing cylinder, which counters dissolving of the powder in water. The powder lumps will arrive in the freezing cylinder where, because of the even lower temperature in the freezing cylinder and the higher viscosity caused thereby, the possibility of dissolving the powder is even lower. As a result the final product (soft-ice) does not have the required quality because of undissolved powder.

Furthermore according to the above mentioned Dutch patent application the mixer is provided with a vessel containing a rotatable star-shaped member having a rotatable crown at each point of the star. This is a disadvantage because in the mixing vessel, notwithstanding the star-shaped member and the crowns, quite a lot of space remains. Because of the large space a considerable quantity of mixture of water and powder mix is present in the mixer which induces the growth of bacteria. If no soft-ice is drained off during a longer period of time, frequent cleaning of the mixer is necessary.

These disadvantages are obviated by this invention. According to the invention the dosage device conveys the powder in accurately dosed quantities into a transit mixer wherein the powder is brought into a well dissolved condition in water and is then conveyed to a separately positioned freezing cylinder through a discharge conduit. Only a very small quantity of dissolved ice composition remains in the mixer and is completely driven away by the next quantity mixed.

The apparatus in a preferred embodiment is preferably provided with a sweeper which is rotatable along the bottom of the dry powder mix reservoir and which comprises one or more arms. The reservoir discharges via a narrow opening into an auxiliary vessel which discharges into the housing of a screw conveyor, a wire cage driven by the screw conveyor being rotatable in said auxiliary vessel.

The combination of said elements results in a dosage device which has the very high dosage accuracy required for uniform product. By the use of the sweeper the powder mix is brought into the auxiliary vessel with a constant density. The wire cage in the auxiliary vessel takes care of a regular filling of the threads of the screw conveyor with powder.

In order to prevent the water vapor which may come out of the mixer condensing on the screw conveyor and thereby forming lumps in the powder, the screw conveyor is provided in a preferred embodiment with a heating device to prevent condensation.

A mixture of powder and water without lumps is produced because according to an important feature of the invention the mixer is provided with a smooth bowl with a truncated conical bottom in which a smooth disc-shaped rotor fits with slight tolerance. The rotor is rotatable relative to the bowl and has an axial passage for supplying powder and water and a tangential outlet for the mixture of water and powder present at the circumference of the bowl. The bowl is closed at the top by a cover in which a supply funnel for powder and water is included which discharges into the axial passage of the rotor.

The water is supplied via a supply conduit tangentially discharging in the supply funnel and arrives together with the powder on the bottom of the bowl through the axial passage. The water is then mixed with the powder during the passage through the gap between the rotor and the bowl, and the gap being narrow such that powder lumps are destroyed here. The width of the gap is preferably between 0.3 and 2 mm. It appears that a very good operation is achieved at a gap width of 0.5–1 mm. The top angle of the truncated conical rotor is preferably between 100°–150°. Very good results are achieved with a top angle between 120°–130°.

Although the transit mixer causes a certain pumping action, said pumping action can be increased by blades attached to the rotor so as to improve the transport of the mixture of powder and water to the freezing cylinder. As a result the freezing cylinder can be arranged at a higher level than the transit mixer, resulting in that the height of the complete apparatus is limited, which is an advantage for easy manipulation of the machine.

Because the volume of the axial passage in the rotor and because the gap between the rotor and the bowl is exceptionally small relative to the volume of the freezing cylinder, at any time only a small quantity of the mixture of powder and water is present in the mixer. The small quantity is moreover completely driven away by the next quantity to be mixed, so that there is no danger of growth of bacteria. Growth of bacteria can futher be prevented by surrounding the bowl with a cooling jacket.

The above mentioned Dutch patent application described only one level sensor which serves to keep the cylinder completely filled. This is a disadvantage when starting with an empty machine, because then the freezing cylinder becomes completely filled with liquid and dissolved powder mix. This mixture will expand because of whipped in air and formation of ice crystals and this expansion will result in frozen ice composition being pressed back to the mixer. This will unfavorably affect the operation of the mixer. In order to prevent this disadvantage the machine according to the invention is provided with at least two level sensors in the freezing cylinder. The first one of the sensors projects to the lowest level and operates during the start of the machine. This lowermost level sensor is adjusted at such a height that the dosage device and the mixer are stopped as soon as the freezing cylinder is filled up to such a level with liquid mixture. After the present quantity of dissolved ice composition is frozen, and has expanded up to a volume which is not larger than the volume of the freezing cylinder, then the control of the level is taken over by the second sensor which is located at a higher level. The second sensor by switching the dosage device and the mixer on and off, takes care of keeping the freezing cylinder always almost completely filled during periods in which soft-ice is periodically drawn off for consumption. As the freezing of the first filling of liquid dissolved ice composition takes an almost constant period of time, the switching from the first sensor over to the second sensor can be controlled by means of a time relay. A third sensor is preferably present, the second sensor being adjusted at a somewhat lower level than the third one. As soon as the level of the soft-ice is below the second sensor, the dosage device and the mixer are switched on. As soon as the level has reached the third and highest sensor, the dosage device and the mixer are switched off again.

In order to enable the mounting of the described sensor system in the freezing cylinder, the stirring mechanism must be left out over a small portion of the cylinder at the location of the sensor system. Moreover for a sensitive level detection it is necessary that at the location of the sensors the ice composition is liquid, i.e., is not frozen. Therefore at the location of the sensor system the freezing cylinder is not surrounded by a cooling coil.

The invention will be further explained in following description of a preferred embodiment as indicated in the enclosed FIGS. 1 to 5.

FIG. 1 schematically shows a front view of the apparatus for the production of soft-ice.

FIG 2 schematically shows a side view of the apparatus according to FIG. 1.

Figure 1:
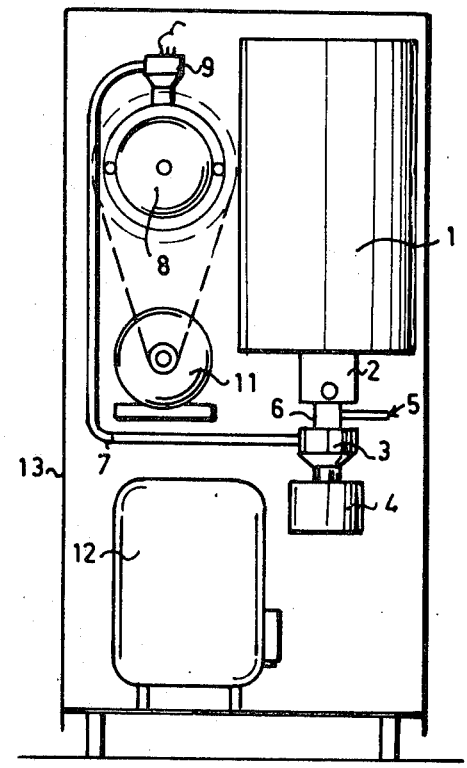
Figure 2:
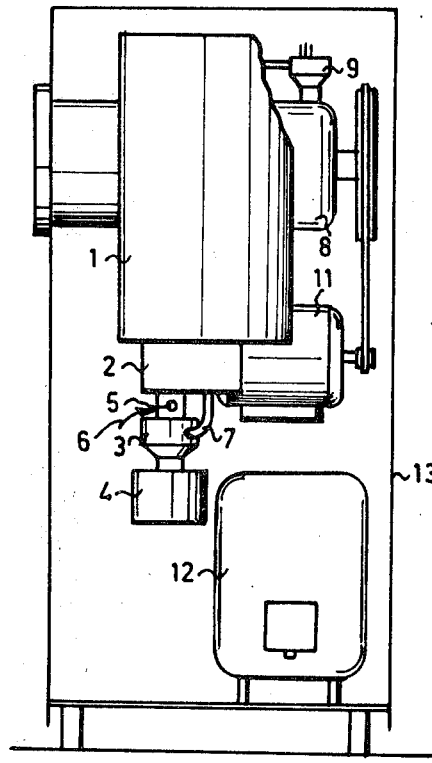

The main components of the machine according to FIGS. 1 and 2 are a reservoir 1 for powder ice composition or dry powder mix, a dosage device 2 for the powder, a transit-mixer 3 with a driving motor 4, funnel 6 with a supply conduit 5 for water, and a conduit 7 for conveying dissolved powder to a freezing cylinder 8. The freezing cylinder is provided with a stirring mechanism with a driving motor 11 and with an inlet portion 9 with level sensors. The machine furthermore comprises a cooling aggregate 12. The complete unit is enclosed by a casing 13. The compact construction appears from the drawing, this compactness being possible because the mixer 3 supplies under pressure to the freezing cylinder 8 which is positioned at a higher level. Should this not be the case, then the reservoir and the mixer would have to be positioned on a higher level than the inlet portion 9 of the freezing cylinder resulting in that the machine would be unpractically high. It has to be taken into account that for comfortably using the machine, the level of the freezing cylinder should be limited to a height of about 1.10 m above the floor.

Figure 3:
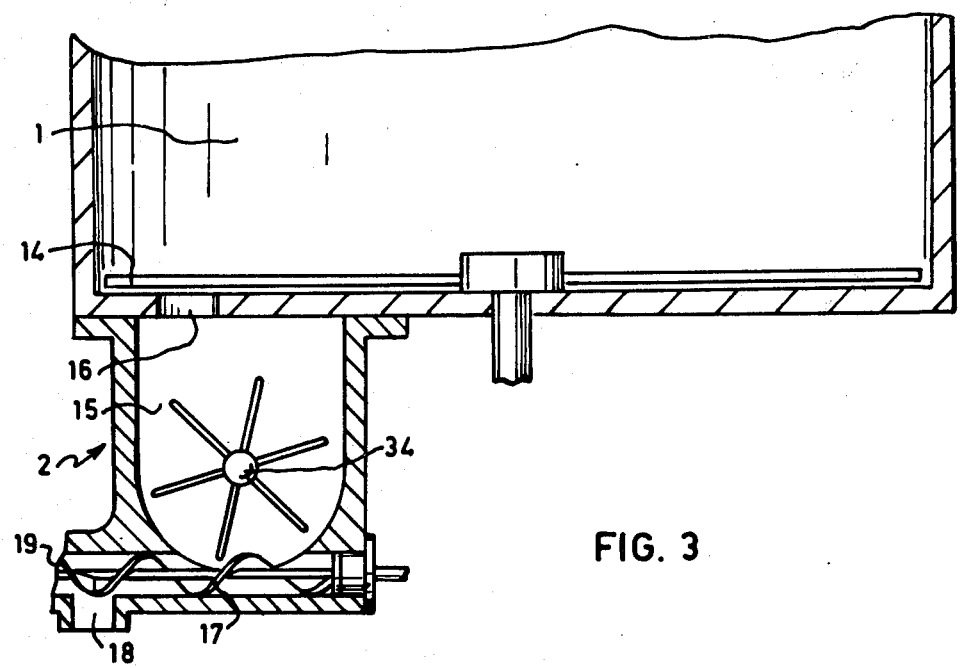
FIG. 3 shows a vertical section of an embodiment of the dosage device.

In FIG. 3 the dosage device 2 is shown more in detail. It consists of a sweeper 14 with one or more arms which rotates along the bottom of the reservoir 1. The dosage device furthermore comprises an auxiliary vessel 15 which communicates via an opening 16 with the reservoir 1 and a screw conveyor 17 which communicates via the dosage opening 18 with the inlet funnel 6 of the transit mixer. The portion 19 of the screw conveyor which is not directly under the auxiliary vessel and lies beyond the dosage opening 18, has an opposite pitch in order to prevent accumulation and compaction of powder in the end of the housing of the screw conveyor beyond the dosage opening. In the auxiliary vessel 15 a wire cage 34 is present and is rotatable by the screw conveyor. The screw conveyor 17 and the sweeper 14 are driven by conventional motors which are not indicated in the drawings.

Figure 4:
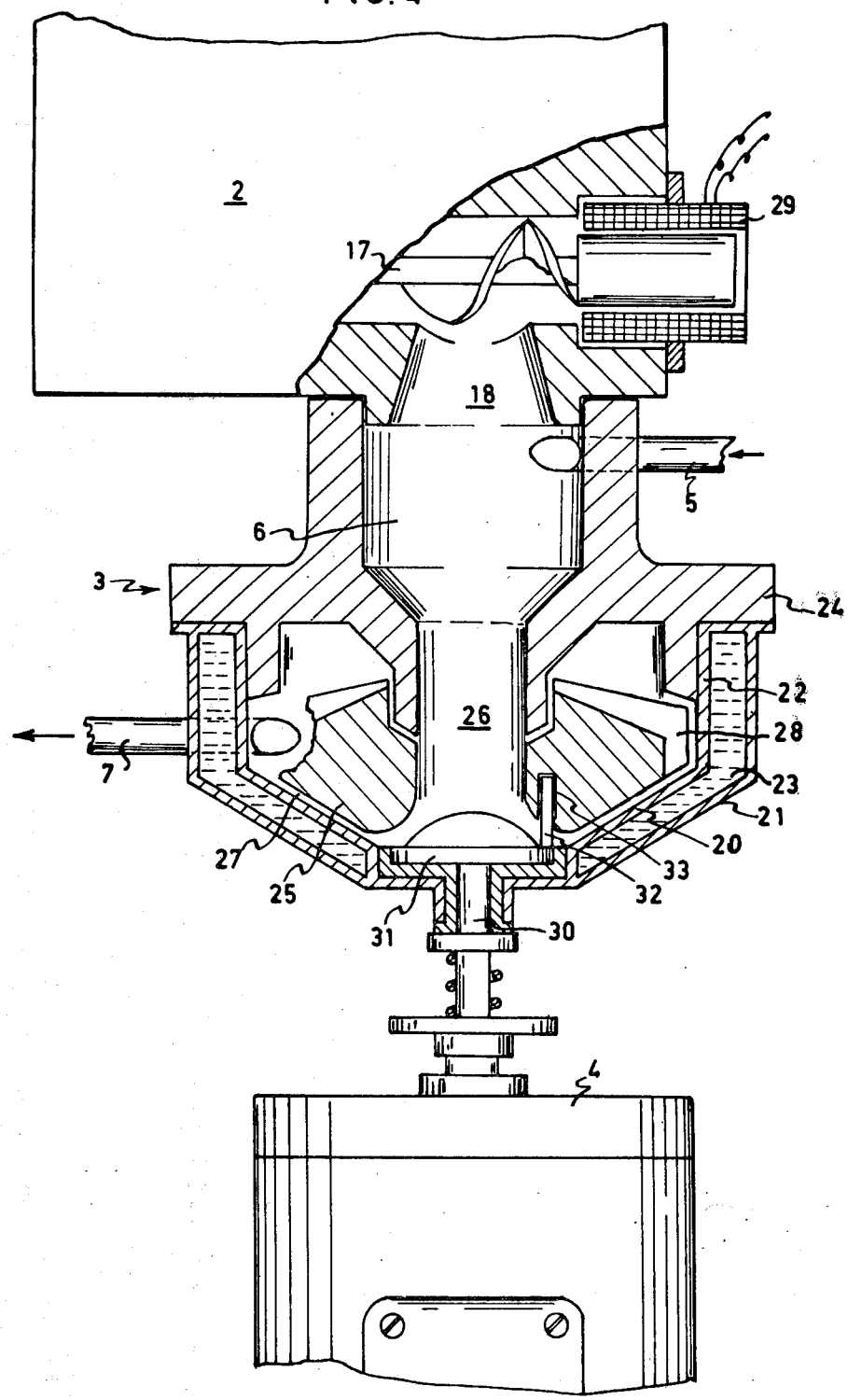
FIG. 4 shows a vertical section of an embodiment of the mixing apparatus.

FIG. 4 is a vertical section through the transit-mixer which consists of a bowl 21 with a truncated conical bottom 20 which with the wide end upward is connected to a cylindrical wall 22, the conical bottom and the cylindrical wall being surrounded by a cooling jacket 23. At the top side the bowl is covered with a cover plate 24 which is provided with the inlet funnel 6. The dosage opening 18 of the dosage device according to FIG. 3 discharges into the funnel in which also the supply conduit 5 discharges water tangentially, said supply conduit 5 communicating with a conventional dosage device for tap water which is not indicated in the drawings.

In the space formed by the bowl 21 and the cover plate 24 a rotor 25 with an axial passage 26 is present. The rotor has the shape of a smooth body of revolution, the lower side of this body, while leaving a narrow gap 27 open, accurately fits in the conical portion 20 of the bowl. The top angle of the truncated conical rotor is preferably between 100° and 150°. Very good results are achieved with a top angle between 120° and 130°. At the outer circumference and top side the rotor is provided with blades 28. The rotor is driven by a motor 4 via a shaft 30 and a disc 31 which is provided with pins 32. Of these pins 32 only one has been drawn in FIG. 4 and the disc 31 preferably contains three pins at mutually equal distances along its circumference. The rotor 25 is supported by the pins 32 which project into bores 33 in the rotor and if desired the width of the gap 27 can be adjustable by making the height of the pins adjustable. The width of the gap is preferably between 0.3-2 mm. It appears that a very good gap operation, i.e. delivery of dissolved ice composition without powder lumps, is achieved at a gap width of 0.5-1 mm. The bowl is provided with a tangential discharge conduit 7 for the dissolved ice composition powder. In order to prevent the screw conveyor 17 becoming moistened by condensation of water vapor coming from the mixer, the screw conveyor is provided with a heating device 29.

Figure 5:
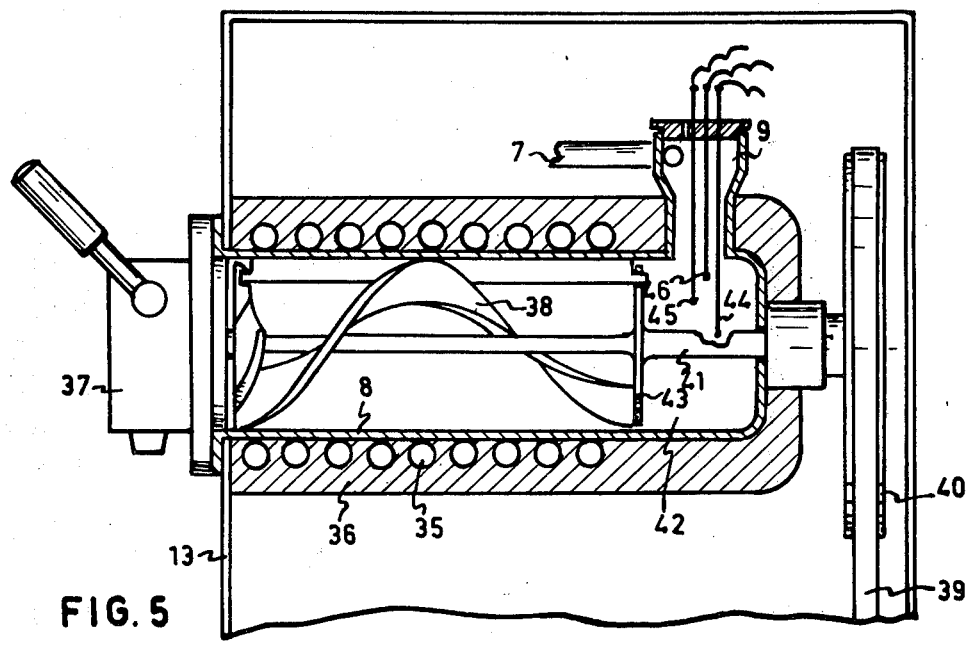
FIG. 5 shows a vertical section of an embodiment of the freezing cylinder with the level detection system.

In FIG. 5 the freezing cylinder 8 is shown in longitudinal cross section. The cylinder is partially surrounded by a cooling coil 35 and completely surrounded by an insulating casing 36. The front side of the cylinder is closed by a conventional draw off device 37 for soft-ice outside the housing 13 of the machine. A stirrer 38 is provided within the cylinder, said stirrer being driven by the motor 11 via a belt 39 reeved over a pulley 40 on a shaft 41. Because the transit-mixer pressurizes the dissolved powder or ice composition, it is possible to mount the freezing cylinder 8 at a higher level than the mixer and at a height which is most comfortable for controlling the draw off device 37.

The rear end portion 42 of the freezing cylinder is disposed outside the stirrer and the cooling coil. This portion 42 is separated from the remaining portion of the freezing cylinder by a circular baffle 43 which is mounted on the shaft of the stirrer and which is a little smaller in diameter than the diameter of the inner cylindrical wall of the freezing cylinder. In the portion 42 of the freezing cylinder the inlet 9 for dissolved powder or ice composition discharges from the discharge conduit 7 of the mixer as indicated in FIG. 4. Three electrical level sensors 44, 45 and 46 each terminate at a different level in the space 42.

The operation of the machine is as follows:

The reservoir 1 is filled with the powder or powdery ice composition. Because of rotation of the sweeper 14 powder is strewn into the auxiliary vessel 15 via the opening 16. Because of rotation of the screw conveyor 17 a quantity of powder, which is constant per time unit, is discharged via the dosage opening 18 to the inlet funnel 6 of the transit-mixer.

Rotation of the wire cage 34 driven by the screw conveyor results in keeping the screw conveyor always completely filled with powder with a constant density for each type of powder. The powder stream is roughly mixed in the inlet funnel 6 with a proportional water stream from the supply conduit 5. The rough mixture of powder and water then arrives via the axial passage 26 in the gap 27 between the rapidly rotating rotor 25 and the bowl 21, where a complete mixing operation takes place until a smooth solution is obtained. The mixture leaves the mixer via the discharge conduit 7 and arrives via the inlet portion 9 in the freezing cylinder 8. As soon as the liquid level reaches the sensor 44 the dosage and mixing device are switched off. The mixture quantity of mixed dissolved powder which is present in the freezing cylinder is frozen accompanied by stirring. When doing so, expansion takes place by whipping in air and because the formed ice crystals occupy a larger volume than the water out of which they are developed. In the portion 42 of the freezing cylinder which portion is not surrounded by cooling pipes, no freezing of the mixture of powder and water takes place. As soon as the freezing operation is finished, ice can be drawn off for consumption via the drawing off device 37. After the freezing operation is finished, the sensor 44 is switched off by a time relay after which the sensors 45 and 46 take over the level control. As soon as the level of the ice composition in the portion 42 descends below the sensor 45 because ice is drawn off via the draw off device 37, the dosage device and the mixer are activated resulting in that dissolved powder is again supplied via the discharge conduit 7. As soon as the level has risen again up to the sensor 46, the dosage device and the mixer are switched off again.

Because in the complete system, except in the freezing cylinder itself, no dissolved powder is stored, the machine is bacteriologically most reliable and it can be used for a long period without being cleaned. Only in the mixer 3 and the discharge conduit 7 a small quantity of dissolved ice composition may remain, which however is already completely driven away by the next quantity to be mixed. In order to further prevent the growth of bacteria in this portion of the machine the mixer is provided with a cooling jacket 23, as is indicated in FIG. 4 and for this purpose the conduit 7 can also be surrounded by a cooling jacket. In the freezing cylinder itself as well as in the portion 42 the temperature is sufficiently low to prevent any growth of bacteria.

If so desired the machine can be equiped with a flush device which, before a considerably longer interruption of the ice delivery, for instance during the night, flushes the mixing device 3 and the discharge conduit 7.

I claim:

1. An apparatus for the production of soft-ice, provided with a reservoir for ice composition powder, a dosage device having a screw-conveyor for the powder, a supply pipe for water, a vertically oriented mixer, at least one level-sensor and a freezing cylinder chilled by a cooling means and containing a stirrer therein, and wherein the dosage device conveys the powder in accurately dosed quantities into the mixer wherein the powder is brought into a well dissolved condition in water and is then conveyed to the separately positioned freezing cylinder through a discharge conduit, wherein the mixer is provided with a bowl having a smooth imperforate bottom surface, a rotor having a smooth disc-shaped bottom surface fitted in the bowl with the bottom surface of the bowl and rotor being spaced closely from one another to form a blending gap, said rotor being rotatable relative to the bowl and having an axial passage for supplying powder and water to said bottom surface, a tangential outlet for the mixture of water and powder being present at the circumference of the bowl.

2. An apparatus according to claim 1 including a sweeper which is rotatable along the bottom of the reservoir and comprises one or more arms, the reservoir discharging via a narrow opening closely spaced below said arms into an auxiliary vessel which discharges into the housing of the screw-conveyor.

3. An apparatus according to claim 2, including a rotatable wire cage in the auxiliary vessel.

4. An apparatus according to claim 3, including a heating device for the screw-conveyor.

5. An apparatus according to claim 1, wherein the rotor is provided with upwardly extending pumping blades remote from said smooth bottom surface.

6. An apparatus according to claim 1, wherein the bowl is surrounded by a cooling jacket.

7. An apparatus according to claim 1, wherein at its inlet end over a short distance the freezing cylinder is free of the stirrer and the cooling means, three level sensors projecting into said free space up to a mutually different level, the lowermost level determining the filling level as long as the contents of the freezing cylinder is not yet completely frozen and the two other sensors determining the filling level as soon as the contents of the freezing cylinder is completely frozen.

8. An apparatus according to claim 5, wherein the freezing cylinder is positioned at a higher level than the mixer and the pumping blades raise the mixture of powder and water to said higher level.

9. An apparatus according to claim 1, wherein the mixture leaves the mixer under overpressure.

10. The apparatus according to claim 1, wherein said blending gap is between 0.3-2 mm.

11. The apparatus according to claim 1, wherein said blending gap is preferably 0.5-1 mm.

12. The apparatus according to claim 1 in which the rotor bottom surface and the bowl bottom surface are smoothly curved truncated concentric cones and the water supply pipe terminates tangentially above the mixer to flush the powder into the mixer.

13. An apparatus quantities into the production of soft-ice, provided with a reservoir for ice composition powder, a dosage device with a screw-conveyor for the powder, a supply pipe for water, a mixer, a freezing cylinder containing a stirrer therein, and wherein the dosage device conveys powder in accurately dosed quantitiesinto the mixer wherein the powder is brought into a well dissolved condition in water and is then conveyed to the freezing cylinder, a chamber between the mixer and the freezing cylinder for holding a variable quantity of mixed powder and water, and three level sensors projecting into said chamber at different levels, the lowermost sensor determining the filling level as long as the contents of the freezing cylinder is not yet completely chilled and the two other sensors determining the filling level as soon as the contents of the freezing cylinder are completely chilled.

* * * * *